United States Patent
Boehnke et al.

(10) Patent No.: US 9,450,627 B2
(45) Date of Patent: *Sep. 20, 2016

(54) TRANSMITTING APPARATUS AND METHOD FOR RECEIVING A DIGITAL SIGNAL IN A DIGITAL TELECOMMUNICATION SYSTEM

(71) Applicant: Sony Deutschland GmbH, Stuttgart (DE)

(72) Inventors: Ralf Boehnke, Esslingen (DE); Thomas Doelle, Munich (DE); Tino Puch, Bonn (DE)

(73) Assignee: SONY DEUTSCHLAND GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/817,862

(22) Filed: Aug. 4, 2015

(65) Prior Publication Data

US 2015/0341065 A1    Nov. 26, 2015

Related U.S. Application Data

(60) Division of application No. 14/037,829, filed on Sep. 26, 2013, which is a continuation of application No. 13/618,613, filed on Sep. 14, 2012, now abandoned, which is a continuation of application No.

(Continued)

(30) Foreign Application Priority Data

Feb. 24, 1999    (EP) ..................... 99103546

(51) Int. Cl.
*H04B 1/16*    (2006.01)
*H04L 7/04*    (2006.01)
*H04L 27/26*    (2006.01)

(52) U.S. Cl.
CPC ................. *H04B 1/16* (2013.01); *H04L 7/042* (2013.01); *H04L 27/2663* (2013.01)

(58) Field of Classification Search
CPC ........... H04L 27/2655; H04L 27/2663; H04L 7/041; H04L 7/042; H04B 1/16
USPC ............... 375/260, 343, 354, 365, 366, 368; 370/203, 206, 208, 480, 509, 511, 513, 370/514
See application file for complete search history.

(56) References Cited

U.S. PATENT DOCUMENTS

| | | |
|---|---|---|
| 4,598,413 A | 7/1986 | Szechenyi |
| 5,005,144 A | 4/1991 | Nakajima et al. |

(Continued)

FOREIGN PATENT DOCUMENTS

| | | | |
|---|---|---|---|
| DE | 27 56 923 A1 | 7/1979 | |
| EP | 0 689 313 A2 | 12/1995 | |

(Continued)

OTHER PUBLICATIONS

Schaub et al., "Frame Synchronization for Spontaneous Transmission" Communications: Connect in the Future, San Diego, Dec. 2-8, 1990, vol. 1, pp. 617-622, XP000218800.

*Primary Examiner* — Betsy Deppe
(74) *Attorney, Agent, or Firm* — Oblon, McClelland, Maier & Neustadt, L.L.P.

(57) ABSTRACT

A receiver that receives a reference symbol comprising a sequence of a plurality of synchronization repetition patterns, wherein each repetition pattern contains a predetermined number of samples. The reference symbol is part of a digital signal modulated by using OFDM modulation. An end synchronization repetition pattern in the reference symbol is phase-shifted by 180°, and the phase-shifted synchronization repetition pattern is positioned after the sequence of the number of synchronization repetition patterns. The receiver detects a timing of a correlation peak at the end of said reference symbol by performing a cross-correlation of the synchronization repetition patterns.

2 Claims, 8 Drawing Sheets

Related U.S. Application Data

11/429,210, filed on May 8, 2006, now Pat. No. 8,861,622, which is a continuation of application No. 11/210,527, filed on Aug. 23, 2005, now abandoned, which is a continuation-in-part of application No. 09/510,652, filed on Feb. 22, 2000, now Pat. No. 7,154,975.

(56) References Cited

U.S. PATENT DOCUMENTS

| | | |
|---|---|---|
| 5,267,264 A | 11/1993 | Shlenker et al. |
| 5,428,647 A | 6/1995 | Rasky et al. |
| 5,539,751 A | 7/1996 | Sabel |
| 5,629,639 A | 5/1997 | Williams |
| 5,651,030 A | 7/1997 | Wong et al. |
| 6,009,125 A | 12/1999 | Ballarin et al. |
| 6,088,406 A | 7/2000 | Suzuki |
| 6,160,821 A | 12/2000 | Dolle et al. |
| 6,483,885 B1 | 11/2002 | Bradley et al. |
| 6,618,452 B1 * | 9/2003 | Huber ............ H04L 27/2607 370/512 |
| 8,861,622 B2 * | 10/2014 | Bohnke ............ H04L 27/2663 375/260 |
| 2015/0078492 A1 | 3/2015 | Böhnke et al. |

FOREIGN PATENT DOCUMENTS

| | | |
|---|---|---|
| EP | 0 702 467 | 3/1996 |
| EP | 0 730 357 A2 | 9/1996 |
| EP | 0 836 294 | 4/1998 |
| WO | WO 97/36395 | 10/1997 |
| WO | WO 98 10421 | 3/1998 |

* cited by examiner

US 9,450,627 B2

TRANSMITTING APPARATUS AND METHOD FOR RECEIVING A DIGITAL SIGNAL IN A DIGITAL TELECOMMUNICATION SYSTEM

CROSS-REFERENCE TO RELATED APPLICATIONS

This application is a divisional of U.S. Ser. No. 14/037,829 filed Sep. 26, 2013, which is continuation of U.S. Ser. No. 13/618,613, filed on Sep. 14, 2012 which is a continuation of Ser. No. 11/429,210 (now U.S. Pat. No. 8,861,622), filed on May 8, 2006, which is a continuation of U.S. Ser. No. 11/210,527, filed on Aug. 23, 2005, which is a continuation-in-part of U.S. Ser. No. 09/510,652, filed Feb. 22, 2000 (now U.S. Pat. No. 7,154,975), the entire contents of each of which are incorporated herein by reference.

BACKGROUND OF THE INVENTION

Field of the Invention

The present invention relates to a transmitting apparatus and a transmitting method, for transmitting a digital signal in a digital telecommunication system. The present invention is hereby particularly directed to the generation and transmission of a reference symbol which is used on a receiver side to achieve a time and/or frequency synchronisation.

Digital telecommunication systems generally need a synchronisation of a transmitting side and a receiving side. The transmitting side and the receiving side can e.g. be base stations and mobile stations of a telecommunication system, whereby the synchronisation of the timing and the frequency of transmitted signals is usually performed in the mobile station. To achieve a synchronisation, it is known to transmit a special training sequence or a reference symbol, also called synchronisation symbol. Such a reference symbol is usually embedded in the transmission data structure and regularly sent so that a synchronisation can be performed regularly.

In FIG. 1, a general structure of a receiving apparatus is shown in order to explain the synchronisation mechanism on which the present invention is based. The receiving apparatus can e.g. be a mobile station of a wireless digital telecommunication system. Although the present invention essentially relates to the transmitting part of a telecommunication terminal, it is to be understood, that the transmitting part or transmitting apparatus of the present invention can also be a or part of a receiving and transmitting terminal.

The receiving apparatus 1 shown in FIG. 1 comprises an antenna 2 for receiving signals from a transmitting side, e.g. a base station of a wireless digital telecommunication system. The received signals 2 are supplied to a HF means (High Frequency means) 3, which downconverts the received high frequency signals into the base band. The downconverted signals are supplied to a IQ-demodulation means 4, where they are demodulated and supplied to a synchronising means 5.

The synchronising means performs time and frequency synchronisation using a received training sequence or reference symbol, as stated above. Using the synchronization information of the synchronising means 5, the received user data signals are further processed in the receiving apparatus 1, e.g. decoded by a decoding means 6 and so on, to be made available in visible or audible form for a user. Usually the synchronisation in the synchronising means 5 is performed in the time domain.

Generally speaking, the synchronising means 5 performs a time domain correlation between the reference symbol (or parts of the reference symbol) and a delayed version of the received reference symbol (or parts of the reference symbol) to identify the reference symbol (or parts of the reference symbol) and thus to determine the timing for the synchronisation. Thereby, a correlation peak is calculated, which should correspond as accurate as possible to the time point of the last sample of the reference symbol.

In order to achieve a well detectable correlation peak, the reference symbol usually consists of a plurality of synchronisation patterns, which are repeated several times within one reference symbol period. The synchronisation patterns usually have the same shape or form and are thus called repetition patterns throughout the present application. A reference symbol therefore contains several repetition patterns, whereby each repetition pattern consists of a plurality of samples. Each repetition pattern has the same number of samples. Between the reference symbol and the adjacent user data symbols, guard intervals can be inserted to avoid intersymbol interference in a multipath environment of the telecommunication system.

The time domain correlation of the received reference symbol in the receiving apparatus 1 can be achieved e.g. on the basis of an auto correlation mechanism or a cross correlation mechanism. An auto correlation mechanism thereby does not require any knowledge about the reference symbol on the receiver side, whereby a cross correlation mechanism requires exact knowledge about the reference symbol to be received on the receiver side.

A known cross correlation means 7 is shown in FIG. 2. The cross correlation means 7 cross correlates incoming signals y(i), e.g. coming from the IQ demodulation means 4, within a cross correlation window of a length 16. The cross correlation window length 16 means that the incoming digital signal y(i) is cross correlated sample by sample on the basis of a length of 16 samples. The cross correlation window length of 16 samples can thereby correspond to the length of a repetition pattern of the reference symbol. In FIG. 3, a reference symbol comprising 9 repetition patterns is shown, whereby one repetition pattern can comprise 16 samples. The receiving apparatus 1 knows exactly the structure of the reference symbol to be received. A complex conjugated version of an expected repetition pattern is stored in the synchronising means 5 and cross correlated to the received signals.

The cross correlation means 7 of FIG. 2, which has a cross correlation window length of 16, comprises 15 delay means 8 arranged serially. The first delay means delays the incoming complex signal y(i) by one sample, which corresponds to multiplication with a factor $z^{-1}$. The second delay means delays the output of the first delay means again by 1 sample and so on. Further, the cross correlation means 7 comprises 16 multiplication means 9 and a sum means 10. The delay means 8, the multiplication means 9 and the sum means 10 are arranged so that an incoming signal having a length of 16 samples is cross correlated with a complex conjugated version of the samples of a repetition pattern. The complex conjugated samples of the expected repetition pattern are e.g. stored in the synchronising means of the receiver and read out respectively to the multiplication means 9. E.g. a first received sample y(0) is multiplied with a complex conjugated version of the first sample of the expected repetition pattern, i.e. $y^*(0)=s_0^*$. The next received sample y(1) is multiplied with $y^*(1)=s_1^*$ and so forth. The sum means 10 adds up all the results from the multiplication means 9, so that an output signal r(i) is obtained. The output signal r(i) of the sum means 10 is supplied to an absolute value calculating means 11 which calculates the absolute value of r(i) to detect a cross correlation peak. The cross correlation means 7 and the absolute value calculating means 11 shown in FIG. 2 can be comprised in the synchronising means 5 of the receiving apparatus 1 shown in FIG. 1.

In FIG. 3, the cross correlation peak detection performed by the cross correlation means 7 and the absolute value calculating means 11 shown in FIG. 2 is explained. FIG. 3 shows three different phases of a cross correlation calculation of an incoming signal. In phase 1, the correlation window 13 of the cross correlation means 7 is located on received user data, which means that only user data are cross correlated. The user data are indicated by "??? . . . ". Thus, no cross correlation peak is detected. In phase 2, the correlation window 13 is exactly matching with the eighth repetition pattern S7 of the reference symbol 12, so that a corresponding cross correlation peak is detected. In phase 3, the cross correlation window 13 is again cross correlating user data "??? . . . ", so that no cross correlation peak is detected.

The reference symbol 12 shown in FIG. 3 comprises 9 repetition patterns S0, S1, . . . , S8, which have identical shapes. Each of the repetition patterns comprises e.g. 16 samples, which corresponds to the cross correlation window length 16 of the cross correlation means 7 in FIG. 2. Of course, the number of repetition patterns in the reference symbol 12 and the number of samples in each repetition pattern can be changed and adopted to the respective application.

As stated above, the cross correlation mechanism requires exact knowledge on the reference symbol to be received on the receiving side. This means, that the receiving apparatus needs to know exactly the structure and number of repetition patterns to be able to recognise the last cross correlation peak, which serves for a time and frequency synchronisation. On the other hand, if one of the cross correlation peaks is not properly detected, the synchronisation fails. In mobile communication environments, in which multipath fading degrades the correlation peak detection performance, the synchronisation performance in a known receiving apparatus of the telecommunication system is thus significantly lowered.

BRIEF SUMMARY OF THE INVENTION

The object of the present invention is to provide a transmitting apparatus and transmitting method for transmitting a digital signal in a digital telecommunication system which generate a reference symbol which allows for an improved time and/or frequency synchronisation performance and accuracy on the receiving side.

According to a first aspect of the invention, a transmitting apparatus for transmitting a digital signal in a digital telecommunication system comprises means for preparing a reference symbol comprising a sequence of a plurality of synchronisation repetition patterns, whereby each repetition pattern contains a predetermined number of samples, means for transmitting said reference symbol as a part of said digital signal by using OFDM (Orthogonal Frequency Division Multiplexing) modulation to a receiver side apparatus, wherein an end synchronisation repetition pattern in said reference symbol is phase-shifted by 180° and said reference symbol comprises a number of said synchronisation repetition patterns and said phase-shifted synchronisation repetition pattern is positioned after the sequence of said number of synchronisation repetition patterns so that the receiver side apparatus can exactly detect a timing of a correlation peak at the end of said reference symbol by performing a cross correlation of said synchronisation repetition patterns. Advantageously, the transmitting apparatus of the present invention further comprises adjusting means for increasing the transmission power when transmitting the reference symbol.

According to a further aspect of the present invention, a method for transmitting a digital signal in a digital telecommunication system comprises the steps of preparing a reference symbol comprising a sequence of a plurality of synchronisation repetition patterns, wherein each repetition pattern contains a predetermined number of samples, transmitting said reference symbols as a part of said digital signal by using OFDM (Orthogonal Frequency Division Multiplexing) modulation to a receiver side apparatus, wherein an end synchronisation repetition pattern in said reference symbol is phase-shifted by 180° and said reference symbol comprises a number of said synchronisation repetition patterns and said phase-shifted synchronisation repetition pattern is positioned after the sequence of said number of synchronisation repetition patterns so that the receiver side apparatus can exactly detect a timing of a correlation peak at the end of said reference symbol by performing a cross correlation of said synchronisation repetition patterns.

Advantageously, the method according to the present invention further comprises the step of increasing the transmission power when transmitting the reference symbol.

According to a further aspect of the present invention, a transmitting apparatus for transmitting a digital signal in a digital telecommunication system comprises means for preparing a reference symbol comprising a sequence of a plurality of synchronisation repetition patterns, wherein each repetition pattern contains a predetermined number of samples, means for transmitting said reference symbol as part of said digital signal by using OFDM (Orthogonal Frequency Division Multiplexing) modulation to a receiver side apparatus, wherein an end synchronisation repetition pattern in said reference symbol is phase-shifted by 180° and said reference symbol comprises a number of said synchronisation repetition patterns and said phase-shifted synchronisation repetition pattern is positioned after the sequence of said number of synchronisation repetition patterns so that the receiver side apparatus can perform a synchronisation process in accordance with said synchronisation repetition patterns and exactly detect the timing of said end of the reference symbol by performing a cross-correlation of said synchronisation repetition patterns.

Advantageously, the transmitting apparatus of the present invention further comprises adjusting means for increasing the transmission power when transmitting the reference symbol.

According to a further aspect of the present invention, a method for transmitting a digital signal in a digital telecommunication system comprises the steps of preparing a reference symbol comprising a sequence of a plurality of synchronisation repetition patterns, wherein each repetition pattern contains a predetermined number of samples, transmitting said reference symbol as a part of said digital signal by using OFDM (Orthogonal Frequency Division Multiplexing) modulation to a receiver side, wherein an end synchronisation repetition pattern in said reference symbol is phase-shifted by 180°) and said reference symbol comprises a number of said synchronisation repetition patterns and said phase-shifted synchronisation repetition pattern is positioned after the sequence of said number of synchronisation repetition patterns so that the receiver side can perform a synchronisation process in accordance with said synchronisation repetition patterns and exactly detect a timing of said end of said reference symbol by performing a cross-correlation of said synchronisation repetition pattern.

Advantageously, the method according to the present invention further comprises the step of increasing the transmission power when transmitting the reference symbol.

According to a further aspect of the present invention, a transmitter device for transmitting OFDM (Orthogonal Frequency Division Multiplexing) signals to a receiver in an OFDM system comprises means for preparing a reference symbol comprising a sequence of a plurality of synchronisation repetition patterns, wherein each repetition pattern contains a predetermined number of samples, means for transmitting said reference symbol as part of said digital signal by using OFDM modulation to a receiver side apparatus in said OFDM system, means for preparing a reference symbol comprising a plurality of successive repetition patterns, whereby said reference symbol is transmitted from said transmitter device by using multicarriers of said OFDM system and a last repetition pattern of said successive repetition patterns is phase-shifted in relation to the other repetition patterns, and wherein each of said successive repetition patterns generated by said generating means is composed of the same number of samples, so that said synchronisation repetition patterns transmitted to said receiver side device are cross-correlated in said receiver side device in order to perform time and frequency synchronisation in said receiver side device.

Advantageously, in the transmitter device according to the present invention, the last repetition pattern of said successive repetition pattern is phase-shifted by 180° in rotation to the other repetition patterns. Further advantageously, the transmitter device according to the present invention further comprises adjusting means for increasing the transmission power when transmitting the reference symbol.

According to a further aspect of the present invention, a method for transmitting OFDM (Orthogonal Frequency Division Multiplexing) signals to a receiver side in an OFDM system comprises the steps of preparing a reference symbol comprising a sequence of a plurality of synchronisation repetition patterns, wherein each repetition pattern contains a predetermined number of samples, transmitting said reference symbol as part of said digital signal by using OFDM modulation to a receiver side in said OFDM system, preparing a reference symbol comprising a plurality of successive repetition patterns, whereby said reference symbol is transmitted from a transmitter side by using multicarriers of said OFDM system and a last repetition pattern of said successive repetition pattern is phase-shifted in relation to the other repetition patterns, and wherein each of said generated successive repetition patterns is composed of the same number of samples, so that said synchronisation repetition patterns transmitted to said receiver side are cross-correlated on said receiver side in order to perform time and frequency synchronisation on said receiver side.

Advantageously, in the method according to the present invention, the last repetition pattern of said successive repetition patterns is phase-shifted by 180° in relation to the other repetition patterns. Further advantageously, the method according to the present invention further comprises the step of increasing the transmission power when transmitting the reference symbol.

According to a further aspect of the present invention, a transmitter device for transmitting OFDM (Orthogonal Frequency Division Multiplexing) signals in an OFDM telecommunication system comprises means for generating said OFDM signals having a reference symbol comprising a plurality of successive repetition patterns, wherein a last repetition pattern of said plurality of successive repetition patterns is phase-shifted in relation to the other repetition patterns, and means for transmitting said generated OFDM signals including said reference symbol and transmitting data to a receiver side device, wherein each of said plurality of successive repetition patterns generated by said generating means is composed of the same number of samples, respectively, so that said repetition patterns transmitted to said receiver side device are cross-correlated in said receiver side device in order to perform time and frequency synchronisation in said receiver side.

Advantageously, in the transmitter device according to the present invention, the last repetition pattern of said plurality of successive repetition patterns is phase-shifted by 180° in relation to the other repetition patterns. Further advantageously, the transmitter device according to the present invention further comprises adjusting means for increasing the transmission power when transmitting the reference symbol.

According to a further aspect of the present invention, a method for transmitting OFDM (Orthogonal Frequency Division Multiplexing) signals in an OFDM telecommunication system comprises the steps of generating said OFDM signals having a reference symbol comprising a plurality of successive repetition patterns, wherein a last repetition pattern of said plurality of successive repetition patterns is phase-shifted in relation to the other repetition patterns, and transmitting said generated OFDM signals including said reference symbol and transmitting data to a receiver side, wherein each of said generated successive repetition patterns is composed of the same number of samples so that said repetition patterns transmitted to said receiver side are cross-correlated on said receiver side in order to perform time and frequency synchronisation on said receiver side.

Advantageously, in the method according to the present invention, the last repetition pattern of said successive repetition patterns is phase-shifted by 180° in relation to the other repetition patterns. Further advantageously, the method according to the present invention further comprises the step of increasing the transmission power when transmitting the reference symbol.

It is to be noted that the use of a sequence of a plurality of synchronisation repetition patterns in the reference symbol significantly enhances the time and frequency synchronisation performance and accuracy as compared to the provision of only a few repetition patterns. Further, by phase-shifting the last synchronisation repetition pattern in the reference symbol by 180° in relation to all other synchronisation repetition patterns in the reference symbol, a very accurate and reliable phase detection on the receiver side and thus an accurate time and/or frequency synchronisation is possible.

BRIEF DESCRIPTION OF THE SEVERAL VIEWS OF THE DRAWINGS

The present invention is explained in detail in the following description by means of preferred embodiments relating to the enclosed drawings, in which.

DETAILED DESCRIPTION OF THE INVENTION

Figure 4:
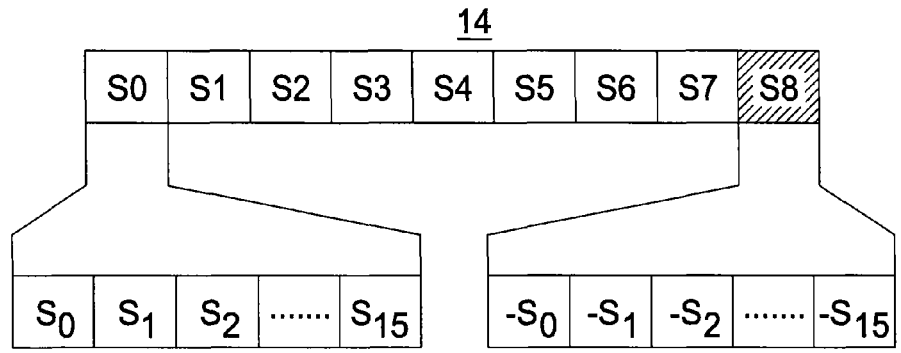
FIG. 4 shows the structure of a reference symbol used for synchronisation according to the present invention.

FIG. 4 shows the structure of a reference symbol 14 as example for a reference symbol structure to be used according to the present invention. The reference symbol 14 of FIG. 4 comprises 9 synchronisation repetition patterns S0, S1, ... S8. Each repetition pattern has a length of 16 samples $s_0, s_1, \ldots s_{15}$. Thereby, the last repetition pattern S8 is phase-shifted by 180 degrees in relation to the other repetition patterns, which means a multiplication by (−1). Thus, the last repetition pattern S8 comprises 15 samples $-s_0, -s_1, \ldots -s_{15}$. All synchronisation repetition patterns of the reference symbol 14 have the same shape, i.e. identical content, whereby the last repetition pattern S8 is phase-inverted by 180 degrees in relation to the other repetition patterns of the reference symbol. All other (preceding) synchronisation repetition patterns have the same phase. It is to be noted, that the reference symbol 14 can have more or less than 9 repetition patterns and that each repetition pattern can have more or less than 16 samples.

Figure 5:
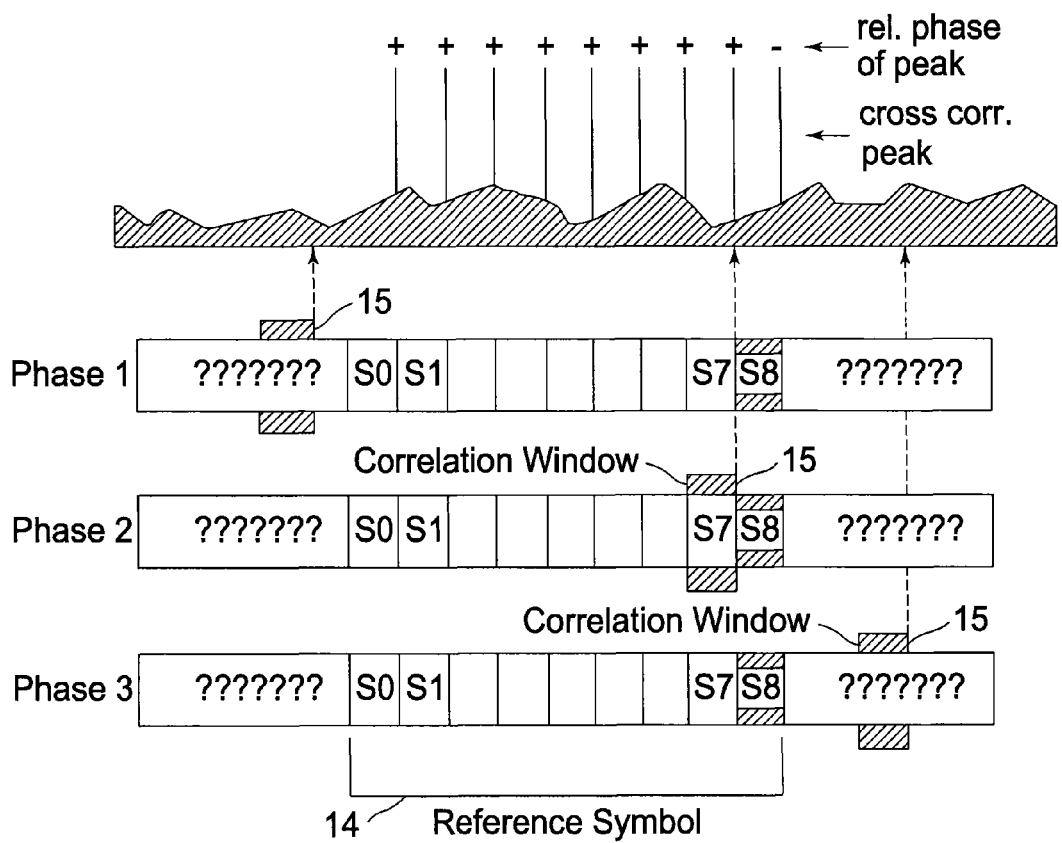
FIG. 5 shows the cross correlation peak detection using the reference symbol shown in FIG. 4.

In FIG. 5, the reference symbol 14 is shown to be embedded in a user data sequence. The reference symbol 14 can hereby be inserted in any wanted or advantageous location within a sequence of data symbols. Between the reference symbol and the data symbols before and after the reference symbols, a so-called guard interval can be inserted in order to avoid inter-symbol interference (ISI) in a multipath environment. In the time domain the reference symbol 14 has a length N and each synchronisation repetition pattern has a length of $N_{sp}$, so that the reference symbol 14 consists of $(N/N_{sp})$ copies of the synchronisation repetition pattern. A very efficient way of generating reference symbols of the desired structure, e.g. in an OFDM (Orthogonal Frequency Division Multiplexing) transmission system, is the application of an IFFT (Inverse Fast Fourier Transformation) exploiting the properties of the DFT (Discrete Fourier Transformation) algorithm. Consequently, in order to generate a reference symbol of length $T_s$ with $(N/N_{sp})$ synchronisation repetition patterns of length $TH N_{sp}/N$ only every $(N/N_{sp})$-th DFT coefficient (every $N/N_{sp}$-th subcarrier in the frequency domain) has to be modulated. At the beginning and/or at the end of a reference symbol 14, a guard interval may be inserted in order to avoid inter-symbol interference (ISI). Hereby, the guard interval can be formed by a cyclic extension of each symbol by copying the last few synchronisation repetition patterns.

Figure 7:
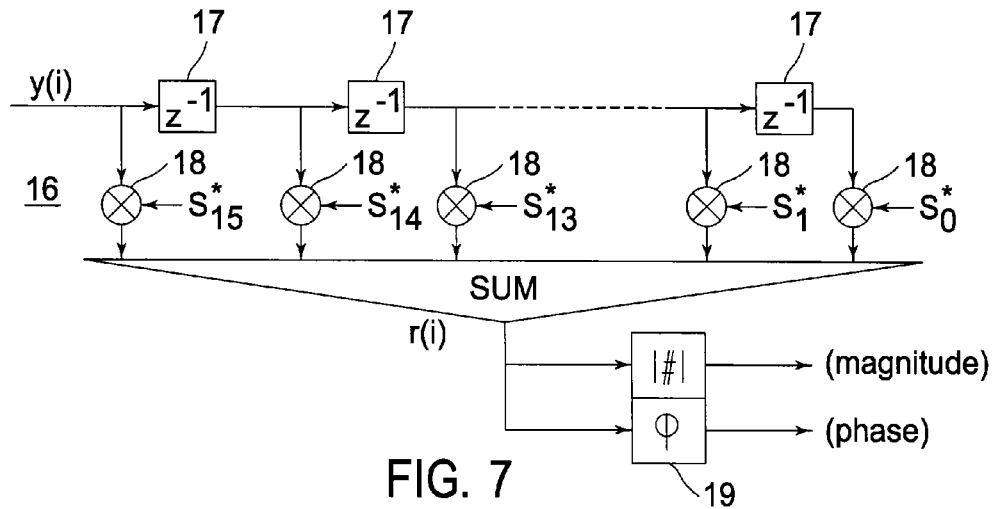
FIG. 7 shows a cross correlation means and a detection means for detecting cross correlation peaks and respective phase information on the basis of a reference symbol as shown in FIG. 4.

The user data are indicated by "??? . . . ". FIG. 5 shows three different phases of cross correlating a received signal having a reference symbol 14, in which the last repetition pattern S8 is phase-inverted by 180°. Relating to the receiving apparatus 1 shown in FIG. 1, the data sequence of the three phases shown in FIG. 5 are for example supplied from the IQ demodulation means 4 to the synchronising means 5, whereby the synchronising means 5 is e.g. constructed as shown in FIG. 7. In phase 1, the cross correlation window 15 cross correlates only user data, so that no cross correlation peak is detected. In phase 2, the 8th repetition pattern S7 of the reference symbol 14 is matched by the correlation window 15, so that a cross correlation peak is detected. The relative phase of the cross correlation peak of the 8th repetition pattern S7 is also detected to be "+". Since the 9th repetition pattern S8 is phase-inverted by 180° in relation to the 8th repetition pattern S7, the cross correlation peak detected for the 9th repetition pattern S8 has the relative phase "−" in relation to the phase of the 8th repetition pattern S7. The repetition patterns S0, S1 . . . S6 preceding the two last repetition patterns S7 and S8 have a relative phase "+".

In phase 3 of FIG. 5, only user data are cross correlated in the cross correlation window 15, so that no cross correlation peak is detected. As can be seen in FIG. 5, by using a reference symbol structure like the one shown in FIG. 4, in which one of the repetition patterns is phase-inverted in relation to at least one of the other repetition patterns in the reference symbol, a relative phase information can be obtained additional to the cross correlation peak information. This phase information provides additional information on the position of the last correlation peak in the reference symbol and thus a more accurate and reliable synchronisation information.

Figure 6:
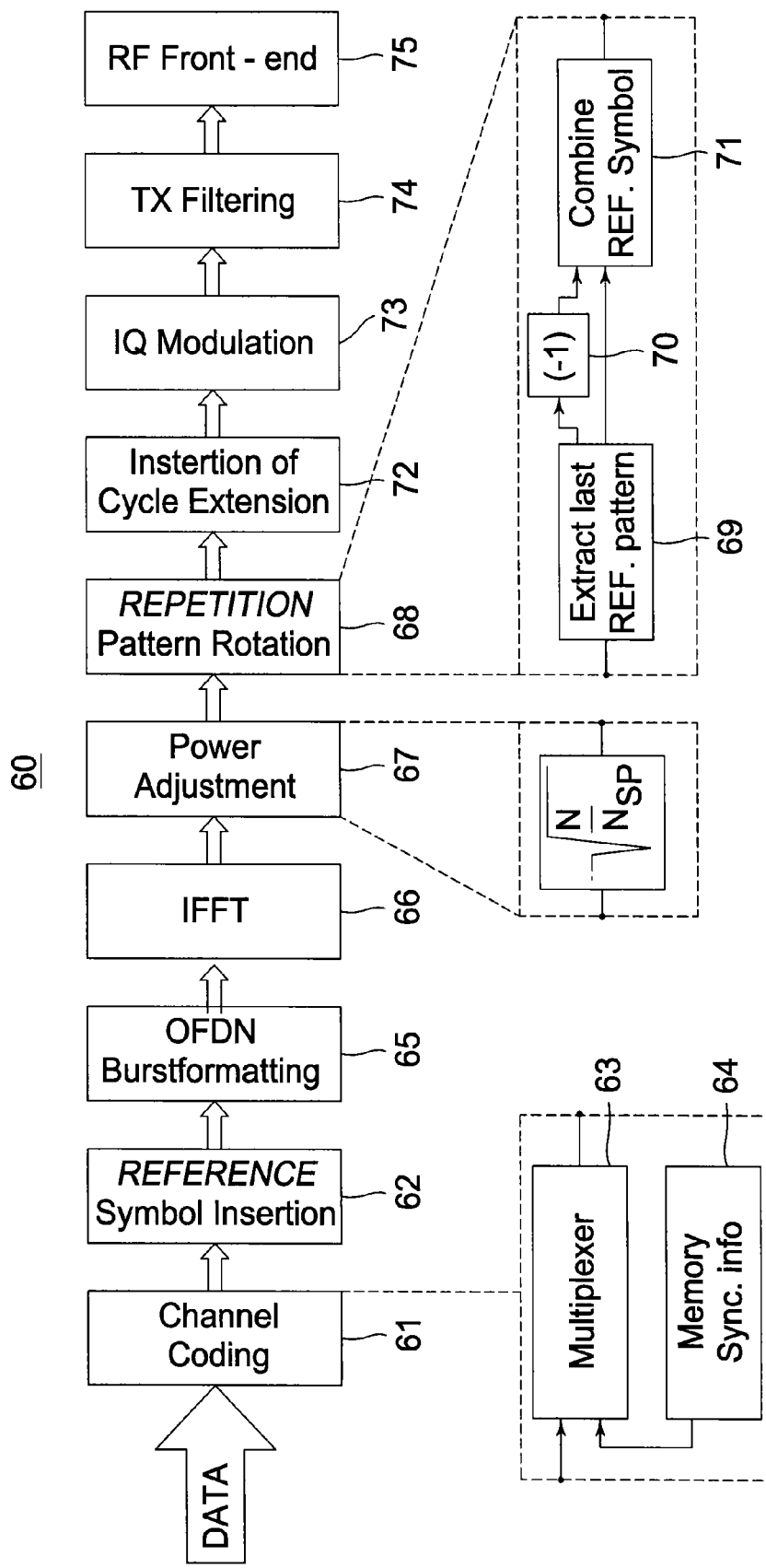
FIG. 6 shows a transmitter structure according to the present invention.

FIG. 6 shows a transmitting apparatus or transmitting device 60 according to the present invention. To be precise, FIG. 6 shows important elements of a transmitting apparatus 60 according to the present invention which are necessary to explain and to understand the present invention. Data to be transmitted are supplied to a channel encoder 61. The output of the channel encoder 61 is supplied to a reference symbol insertion circuit 62. In the reference symbol insertion circuit 62, the reference symbols from a memory 64, where they are stored, are multiplexed by a multiplexer 63 with the data to be transmitted. The output from the reference symbol insertion circuit 62 is supplied to an OFDM (Orthogonal Frequency Division Multiplexing) burst mode controller 15. The output from the OFDM burst mode controller 65 is given to an inverse FFT circuit 66. The output from the inverse FFT circuit 66 is supplied to a power adjustment circuit 67. In the power adjustment circuit 67, the transmitting power is increased when a reference symbol is transmitted. The output from the power adjustment circuit 67 is supplied to a synchronisation repetition pattern rotation (inverting) circuit 68. The synchronisation repetition pattern rotation circuit 68 contains a circuit 69 for extracting the last synchronisation repetition pattern of a reference symbol, a phase shifter 70 and a combining circuit 71 combining the phase shifted last synchronisation repetition pattern of a reference symbol with the other synchronisation repetition patterns in the same reference symbol. The output of the synchronisation repetition pattern rotation circuit 68 is supplied to a circuit 72 which inserts a cyclic extension into the reference symbol. Then the data stream containing the data to be transmitted as well as the reference symbols is modulated by a modulator 73 on a radio frequency (RF). After filtering the data to be transmitted in a filter 74 the filter data are given to an RF-front-end stage 75. The reference symbols are inserted into the data in the frequency domain to avoid the generally large implementation effort when inserting the reference symbols of the data in the time domain.

The average power of the reference symbol upon transmission is lower than the average power of other OFDM-symbols due to the lower number of modulated subcarriers. Therefore, the adjustment circuit 67 is provided in order to increase the transmitting power to match the average transmission power of the OFDM-data symbols. This can be achieved by a multiplication of each sample of the reference symbol with a power adjustment factor which calculates to $F_{power}=\sqrt{N/N_{sp}}$. After the power adjustment the last synchronisation repetition pattern is rotated by 180°, which is realised through a multiplication by −1 in the synchronisation repetition pattern rotation circuit 68. After the complex signal is converted into a real signal by the IQ-modulator 73, it is passed to the transmission RF-front-end stage 75 in order to be transmitted through an antenna over a wireless link to a receiving device, which is e.g. disclosed in the following figures.

Figure 1:
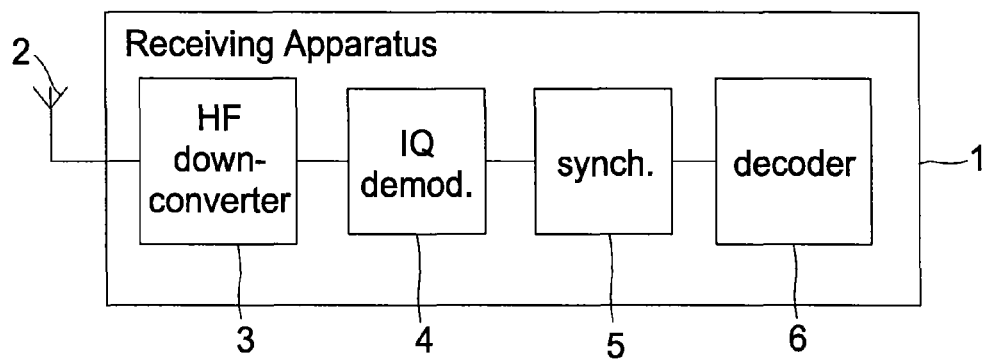
FIG. 1 shows the general structure of a receiving apparatus of a digital telecommunication system.

In FIG. 7, a cross correlation means 16 and a detection means 19 are shown, which can be implemented in a first embodiment of a synchronising means 5 of a receiving apparatus 1 of the present invention, the general structure of which is shown in FIG. 1. The structure of the cross correlation means 16 is identical to the structure of the cross correlation means 7 shown in FIG. 2, so that a detailed explanation is omitted. The cross correlation means 16 comprises 15 delay means 17 and 16 multiplication means 18 as well as a sum means for adding the outputs of the multiplication means 18. The cross correlation window length of the cross correlation means 16 corresponds to the length of one repetition pattern, which is e.g. 16 samples. A received data stream of 16 samples is cross correlated with complex conjugated samples of an expected repetition pattern stored in the receiving apparatus 1. The output signal r(i) of the sum means, i.e. the output signal of the $\phi$ cross correlation means 16 is supplied to a detection means 19 for detecting the magnitude and the phase of the signal r(i) and therefore the exact position of the cross correlation peak of the last repetition pattern S8 of the reference symbol 14 can be detected (cf. FIG. 5).

Figure 8:
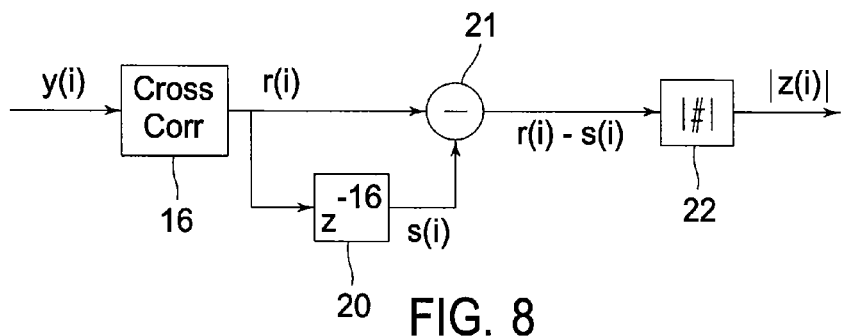
FIG. 8 shows a cross correlation means and another detection means for detecting a single cross correlation peak on the basis of a reference symbol as shown in FIG. 4.

FIG. 8 shows another arrangement of the detection means. The cross correlation means 16 of FIG. 8 corresponds to the cross correlation means 16 of FIG. 7. In the example shown in FIG. 8, the detection means comprises a delay means 20 for delaying the output signal r(i) of the cross correlation means 16 by one repetition pattern length, which is e.g. 16 samples. The detection means 19 further comprises a subtraction means 21 for subtracting the output signal s(i) of the delay means 20 from the output signal r(i) of the cross correlation means 16. The output signal z(i)=r(i)−s(i) of the subtraction means 21 is supplied to an absolute value calculation means 22, which calculates the absolute value of z(i). It is to be noted, that y(i), r(i), s(i), z(i) are complex values so that the magnitude and the phase information is contained in z(i). If it is assumed, that r(i) is in the part of the reference symbol, in which the phase of the repetition patterns is not phase-shifted, for example in the part S0, . . . S7 of the reference symbol 14 shown in FIG. 4, then $s(i)r(i-16)=r(i)\cdot e^{i\Phi}\Psi z_1(i)=r(i)-s(i)=r(i)(1-e^{i\Phi})$.

If it is assumed, that r(i) matches with the phase-inverted repetition pattern S8 of the reference symbol 14, then $s(i)=r(i-16)=-r(i)\cdot e^{i\Phi}\Psi z_2(i)=r(i)-s(i)=r(i)(1+e^{i\Phi})$.

It can be seen that the absolute value of z(i) is enhanced if r(i) matches with the phase-shifted repetition pattern S8. The phase value $\phi$ has nothing to do with the phase shift between the repetition pattern S7 and S8, but results from a possible frequency offset between the transmitter side and the receiver side. Considering the detection range of the phase change introduced by the reference symbol structure according to the present invention under the influence of a frequency offset between the transmitter and the receiver, the following result is obtained: $z_1(i)/z_2(i)=-j\cdot\cot(\phi/2)$. Thus, for a non-ambiguous detection the absolute value of $\phi$ has to be smaller than $\pi$, whereby the phase value c is the product between the frequency offset and the duration $T_P$ of one repetition pattern, $\phi=2\pi f_{offset}T_P$.

Figure 9:
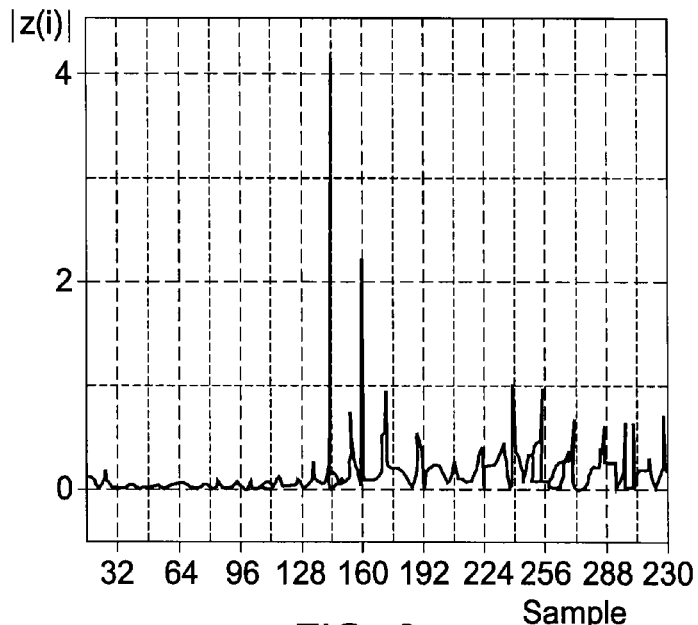
FIG. 9 shows a simulation result for the absolute value of an output signal of the structure shown in FIG. 8.

In FIG. 9, a simulation result for the absolute value of z(i) as the output signal of the structure shown in FIG. 8 is shown. For the reference symbol 14 comprising 9 repetition patterns, whereby each repetition pattern consists of 16 samples, and whereby the phase of the last repetition pattern S8 is inverted in relation to the phase of the ether repetition patterns, the cross correlation peak is expected to be at the last sample, i.e. the time point corresponding to the last sample, of the last repetition pattern S8. As can be seen in FIG. 9, the cross correlation peak is located at sample 144, which is the correct value. Thus, the cross correlation means 16 and the detection means 19 shown in FIG. 9 and in FIG. 8 enable a correct and efficient detection of the cross correlation peak.

Figure 10:
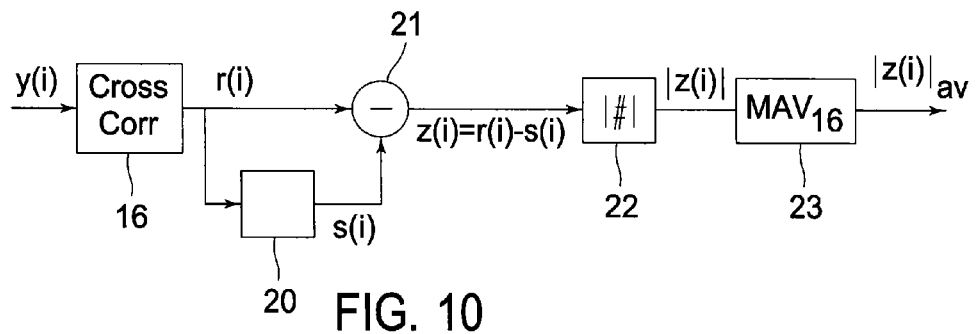
FIG. 10 shows a further embodiment of detection means of FIG. 6.

In FIG. 10, the cross correlation means 16 and another embodiment of the detection means of FIG. 8 are shown. Thereby, the structure shown in FIG. 10 corresponds to the structure shown in FIG. 8, whereby the output of the absolute value calculating means 22 is supplied to an averaging means 23 for smoothening the absolute value of z(i) output from the means 22. The structure shown in FIG. 10 is particularly advantageous in severe noise and fading environments. The averaging means 23 advantageously is a moving average filter having a filter length corresponding to the length of one repetition pattern, which is for example 16 samples as shown in FIG. 4. The cross correlation structures shown in figure FIGS. 8 and 10 can e.g. be implemented in the synchronising means 5 of the receiving apparatus 1 shown in FIG. 1.

Figure 11:
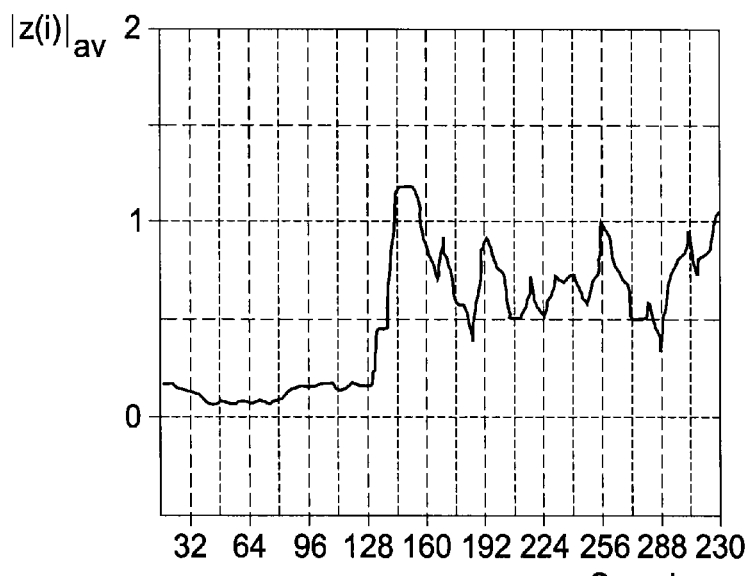
FIG. 11 shows a simulation result of the cross correlation means and the detection means of FIG. 10.

FIG. 11 shows a simulation result for the averaged absolute value of z(i) as the output signal of the structure shown in FIG. 10. The detection of the last repetition pattern having an inverted phase as shown in FIG. 4 can be seen in the transition between sample 128 and sample 144.

Figure 12:
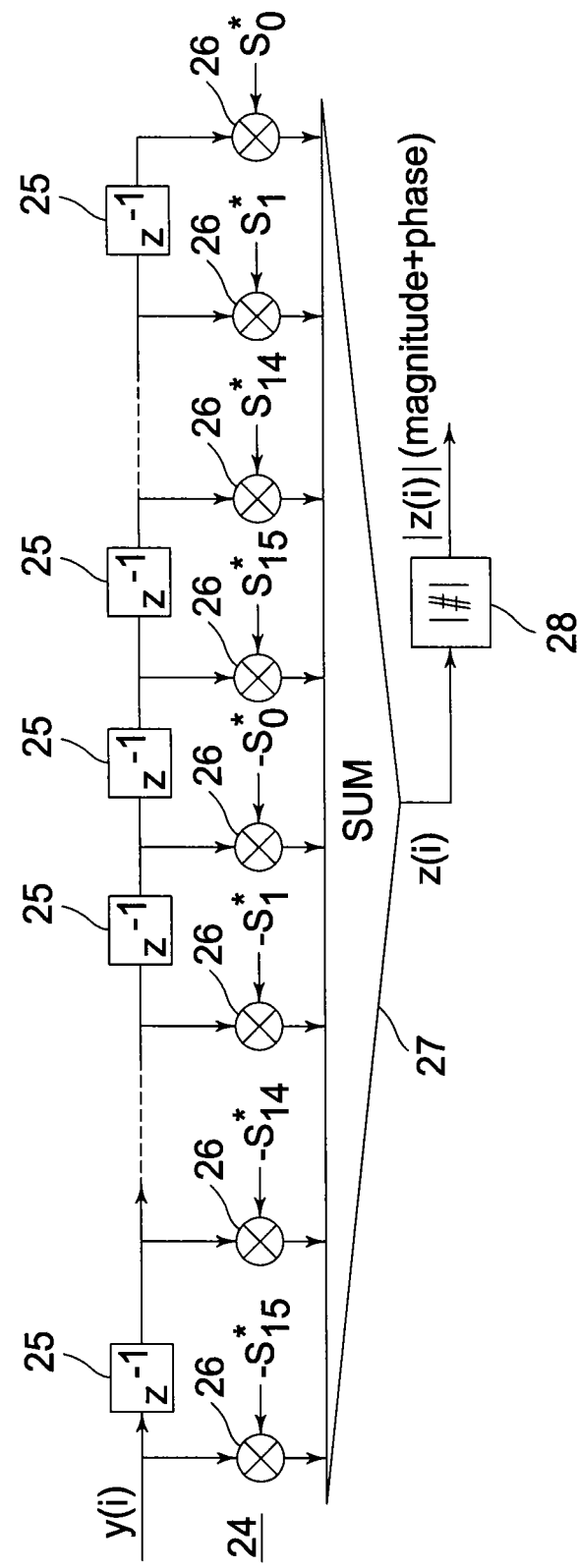
FIG. 12 shows a further embodiment of a cross correlation means according to the present invention together with an absolute value calculation means.

In FIG. 12, a second embodiment of a cross correlation means 24 is shown, which CM be implemented in a synchronising means 5 of a receiving apparatus 1 of the present invention, a general structure of which is e.g. shown in FIG. 1.

Figure 2:
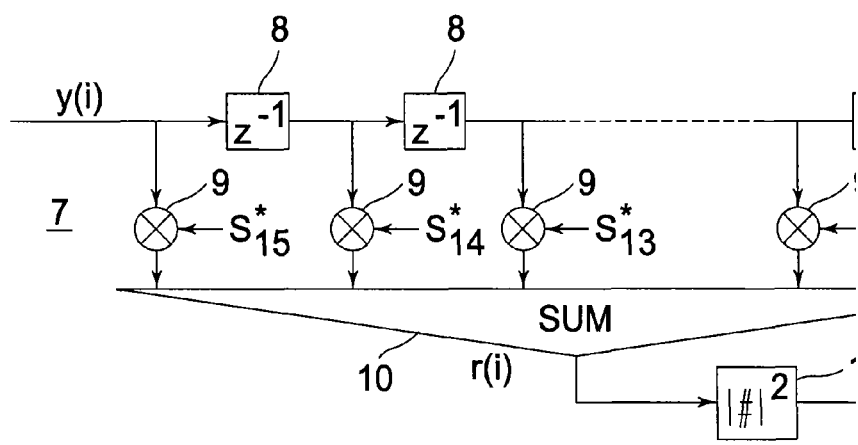
FIG. 2 shows a known cross correlation means and absolute value calculation means for detecting a cross correlation peak.
Figure 3:
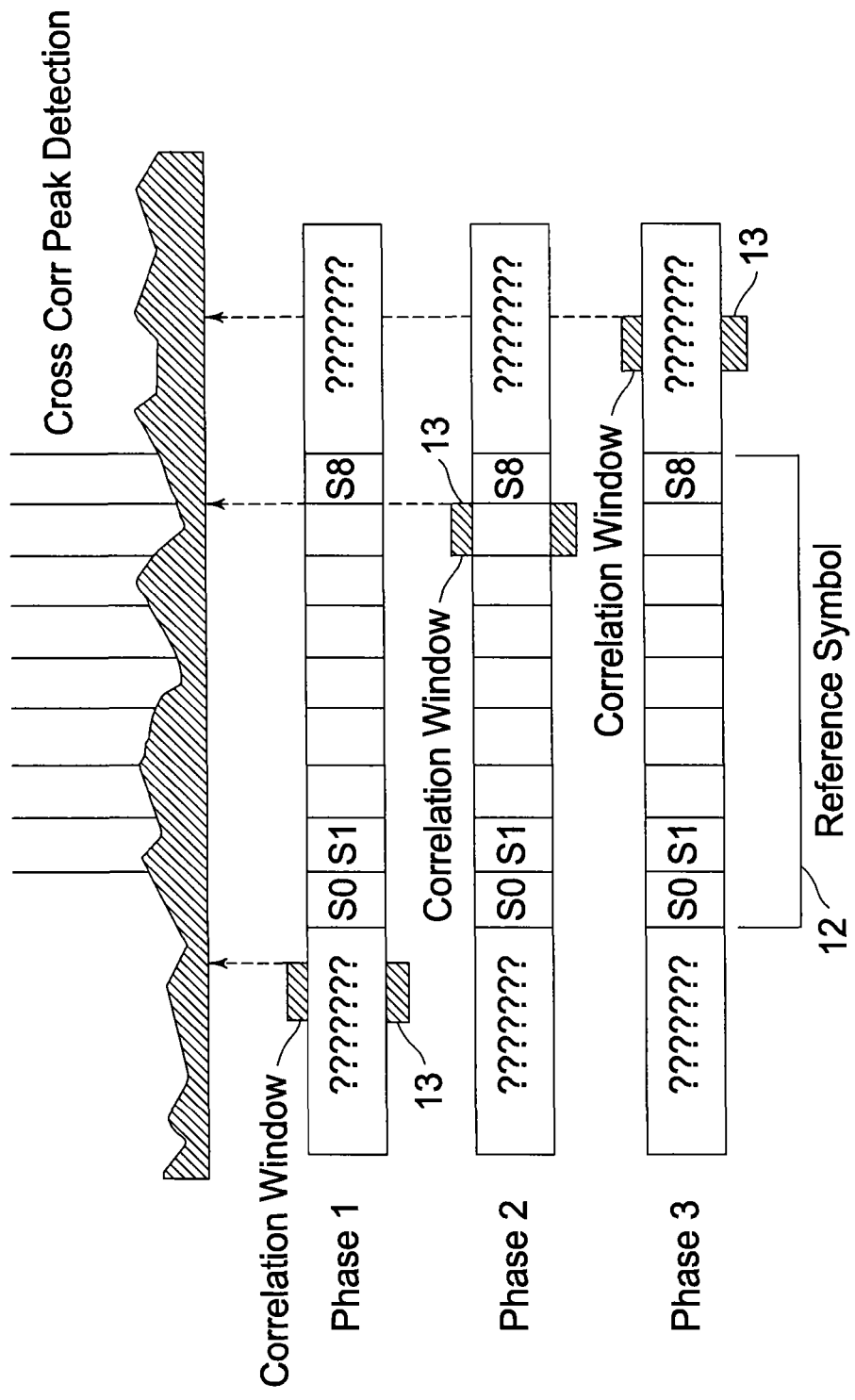
FIG. 3 shows the cross correlation peak detection performed by the cross correlation structure of FIG. 2.

The cross correlation means 24 essentially has the same structure as the cross correlation means 16 shown in FIG. 7 and the cross correlation means 7 shown in FIG. 2. The main difference is, that the cross correlation means 24 shown in FIG. 12 has a cross correlation window length of two repetition patterns, which in the shown example corresponds to 32 samples, when the structure of the reference symbol shown in FIG. 4 is assumed. Thereby, the cross correlation means 24 comprises 31 delay means 25, which are arranged serially and respectively cause a delay of one sample. Further, the cross correlation means 24 comprises 32 multiplication means, which multiply the respective (delayed) samples of the received signal y(i) with stored positive and negative complex conjugated values of the samples of the expected repetition pattern. Thereby, e.g. the first sample entering the cross correlation means 24 is multiplied with the first complex conjugated sample $s_0^*$ of the expected repetition pattern. The same is true for the rest of the samples entering the cross correlation means 24, which are respectively multiplied with the rest of the stored (positive) complex conjugated samples $s_1^*$ to $s_{15}^*$. The second 16 samples entering the cross correlation means 24 are respectively multiplied will the stored negative complex conjugated samples $-s_0^*$ to $-s_{15}^*$ of the expected repetition pattern. Hereby, e.g. the first sample entering the means 24 is multiplied with the negative value of the complex conjugated first sample of the expected repetition pattern $-s_0^*$. The same is true for the rest of the second 16 samples entering the means 24 which are respectively multiplied with the negative values of the complex conjugated values, namely $-s_1^*$ to $-s_{15}^*$. It is to be noted, that the values $s_0$, $s_1, \ldots, s_{15}$ of the repetition patterns S0, S1, ..., S8, of the reference symbol 14 shown in FIG. 4 are respectively the same. In other words, all the repetition patterns S0, S1, ..., S8 of the reference symbol 14 of FIG. 4 have the same shape, except that the last repetition pattern S8 has an inverted phase.

The outputs of the multiplication means 26 of the cross correlation means 24 are added up in a sum means 27, which generate an output signal z(i). The output signal z(i) of the sum means 27 is supplied to an absolute value calculation means 28, which calculates the absolute value of z(i). The output signal of the absolute value calculation means 28 therefore provides information on the magnitude as well as on the phase of the data signals, which are cross correlated by the cross correlation means 24.

Figure 13:
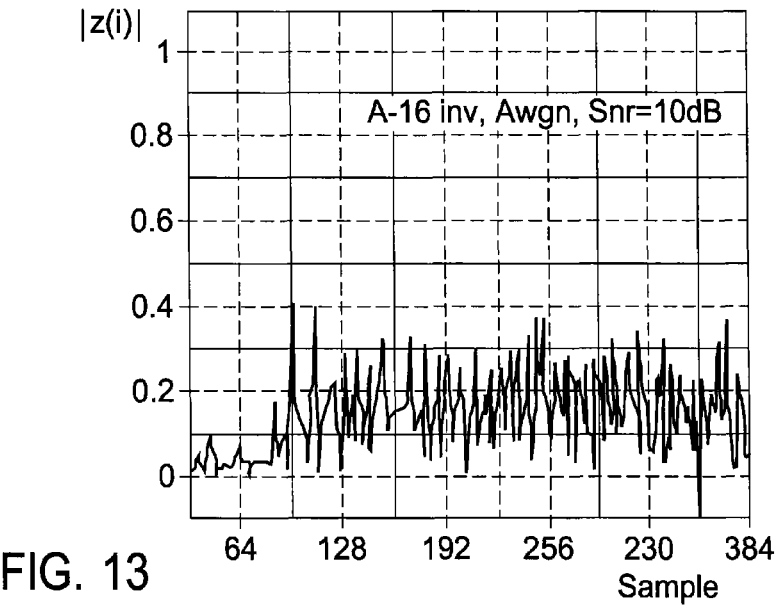
FIG. 13 shows a simulation result of the cross correlation means and the absolute value calculation means shown in FIG. 12 for detecting a cross correlation peak.

A simulation result for the output of the absolute value calculation means 28 of the structure shown in FIG. 12 is shown in FIG. 13. In this case, a reference symbol similar to the reference symbol 14 shown in FIG. 4 had been used, but only with 6 repetition patterns, whereby each repetition pattern consists of 16 samples. The phase of the last repetition pattern is shifted by 180° in relation to the other preceding repetition patterns. Thus, the position of the last sample of the last repetition pattern is expected to be at sample position number 96, which is clearly visible in the simulation result shown in FIG. 13. FIG. 13 shows clearly, that the output signal has a maximum exactly when a correct overlapping between the two repetition patterns processed in the cross correlation means 24 is achieved.

Figure 14:
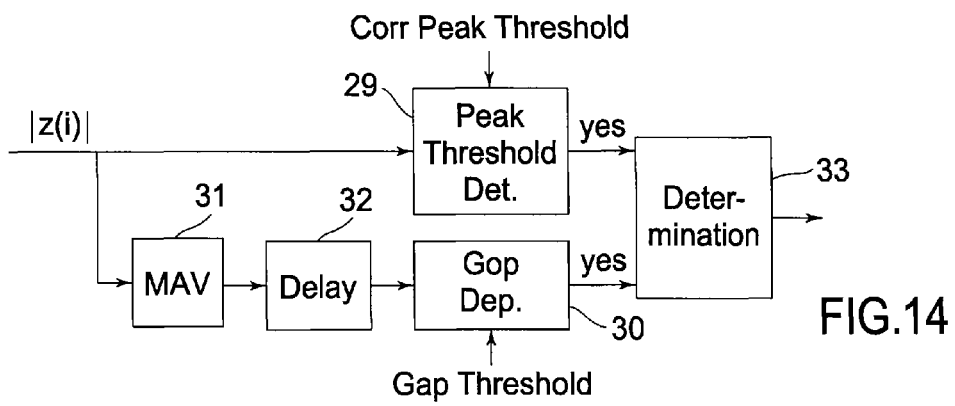
FIG. 14 shows a further embodiment of a synchronising structure according to the present invention comprising a cross correlation means according to the present invention and a peak threshold detection means and a gap detection means.

FIG. 14 shows an extended structure for increasing the reliability and accuracy of the output signal of the absolute value calculation means 22 of the structure shown in FIG. 8, the averaging means 23 of the structure shown in FIG. 10 or the absolute value calculation means 28 of the structure shown in FIG. 12. In the improved structure shown in FIG. 14, the respective output signal of the cross correlation means 24 or the detection means 19, which is the absolute value of z(i), is supplied to a peak threshold detection means 29 and a gap detection means 30. The peak threshold detection means 29 detects if the absolute value of z(i) exceeds a predetermined cross correlation peak threshold. The gap detection means 30 detects if the absolute value of z(i) has been below a predetermined gap threshold before said detected cross correlation peak. In FIG. 13 it can be seen, that the absolute value of z(i) is zero or close to zero as long as the data signals entering the cross correlation means are in the part of the reference symbol, where the phase of the repetition patterns is not inverted in relation to each other. Hereby, a presynchronisation can be achieved, since the detected correlation peak is only confirmed when the gap in front of the correlation peak is detected.

In other words, the gap in front of the correlation peak can be used to identify the (range for the possible position of the cross correlation peak. Only when the peak threshold detection means 29 detects that the absolute value of z(i) exceeds the predetermined cross correlation threshold and the gap detection means detects that the absolute value of z(i) has been below a predetermined gap threshold before the detective cross correlation peak, the cross correlation peak is confirmed. In this case, the peak threshold detection means 29 and the gap detection means 30 send respectively a positive information to a determination means 33, which can for example be an AND gate, which outputs the position of the detected cross correlation peak only in case of a positive signal from both of the means 29 and 30. In front of the gap detection means 30, an averaging means 31 and/or a delay means 32 can be located. The averaging means 31 can for example be a moving average filter to smoothen the absolute value of z(i). The filter length preferably corresponds to the length of one repetition pattern of the reference symbol. The delay means 32 preferably provides a delay corresponding to the length of one repetition pattern of the reference symbol. The averaging means 31 as well as the delay means 32 can be provided or not depending on the application.

Figure 15:
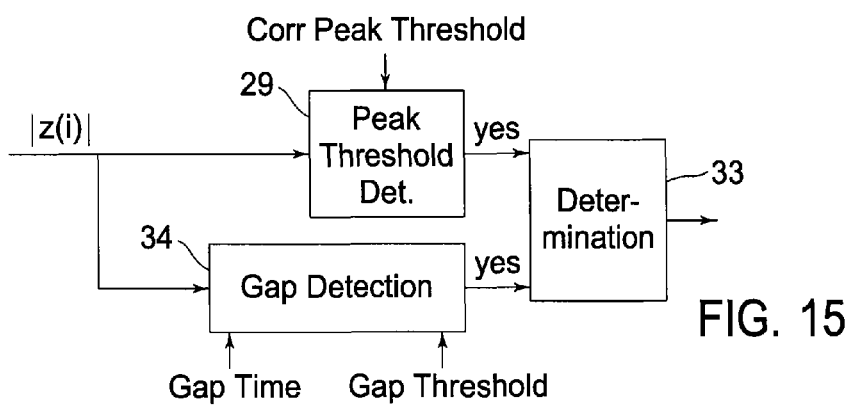
FIG. 15 shows an alternative structure to the embodiment shown in FIG. 14.

FIG. 15 shows an alternative structure to FIG. 14. In FIG. 15, the absolute value of z(i) is supplied to a peak threshold detection means 29 identical to the peak threshold detection means 29 of FIG. 14. The gap detection means 34 shown in FIG. 15 detects if the absolute value of z(i) has been below a predetermined gap threshold before the detected cross correlation peak and additionally detects if it has been below the predetermined gap threshold during a predetermined gap time. In the contrary to the gap detection means 30 of FIG. 14, which only checks one time point before the detected cross correlation peak, the gap detection means 34 of FIG. 15 checks a time period before the detected cross correlation peak. Identically to FIG. 14, a determination means 33, which can for example be an AND gate, determines if the output signals from the peak threshold detection means 29 and the gap detection means 34 are both positive and confirms the detected correlation peak to be the required correlation peak for that case. Both structures shown in FIGS. 14 and 15 provide an increased detection accuracy and reduce the false alarm possibility by combined detection of a presynchronisation and a correlation peak detection. The presynchronisation, i.e. the detection of the gap in front of a detected cross correlation peak enables to detect the range of possible synchronisation peak positions, what can be used to reduce the number of computations needed for the succeeding synchronisation.

It has to be noted, that although the cross correlation and synchronisation structures shown in FIGS. 7, 8, 10, 12, 14 and 15 can be implemented in the synchronising means 5 of the receiving apparatus 1 shown in FIG. 1, these inventive structures can be implemented or used in any other receiving apparatus as long as the scope of the present invention as defined in the enclosed claims is met.

The invention claimed is:

1. A receiver comprising:
  circuitry configured to
    receive a reference symbol comprising a sequence of a plurality of synchronization repetition patterns, wherein each repetition pattern contains a predetermined number of samples, the reference symbol is part of a digital signal modulated by using OFDM modulation, and an end synchronization repetition pattern in the reference symbol is phase-shifted by 180° in relation to other synchronization repetition patterns included in the reference symbol; and
    detect a timing of a correlation peak at an end of the reference symbol by performing a cross-correlation of the plurality of synchronization repetition patterns.

2. A receiver comprising:
  circuitry configured to
    receive a reference symbol comprising a sequence of a plurality of synchronization repetition patterns, wherein each repetition pattern contains a predetermined number of samples, the reference symbol is part of a digital signal modulated by using OFDM modulation, an end synchronization repetition pattern in the reference symbol is phase-shifted by 180° in relation to other synchronization repetition patterns included in the reference symbol; and
    perform a synchronization process by detecting a timing of an end of the reference symbol by performing a cross-correlation of the plurality of synchronization repetition patterns.

* * * * *